Aug. 6, 1946.  C. R. NICHOLS, JR  2,405,367
PENCIL MACHINE
Filed Feb. 6, 1943  8 Sheets-Sheet 1

INVENTOR.
CHARLES R. NICHOLS, JR.
BY
Luther W Hawley

Aug. 6, 1946.  C. R. NICHOLS, JR  2,405,367
PENCIL MACHINE.
Filed Feb. 6, 1943  8 Sheets-Sheet 2

INVENTOR
CHARLES R. NICHOLS, JR.
BY
ATTORNEY

Aug. 6, 1946.  C. R. NICHOLS, JR  2,405,367
PENCIL MACHINE
Filed Feb. 6, 1943  8 Sheets-Sheet 3

INVENTOR
CHARLES R. NICHOLS, JR.
BY
Luther W. Hawley
ATTORNEY

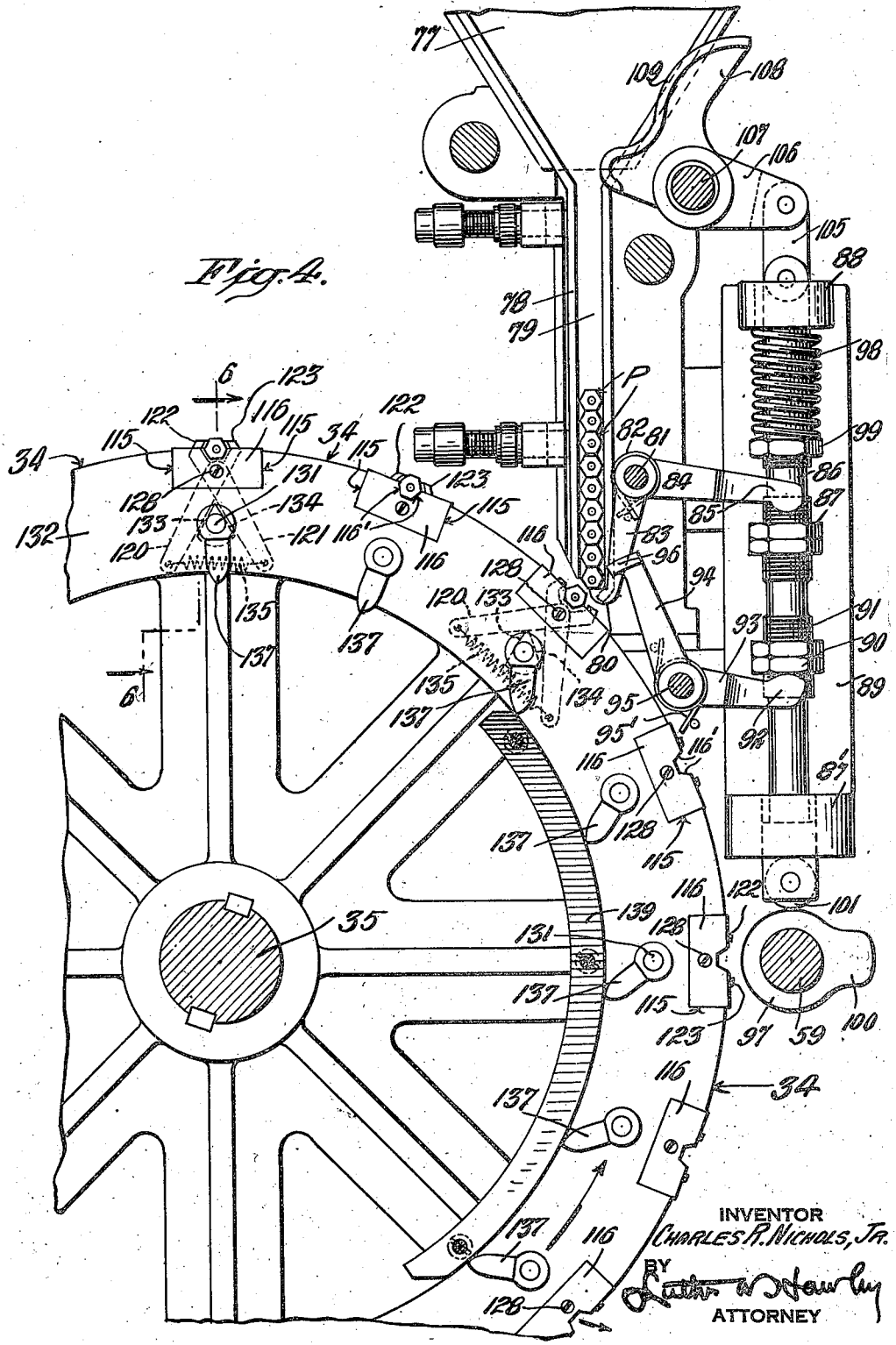

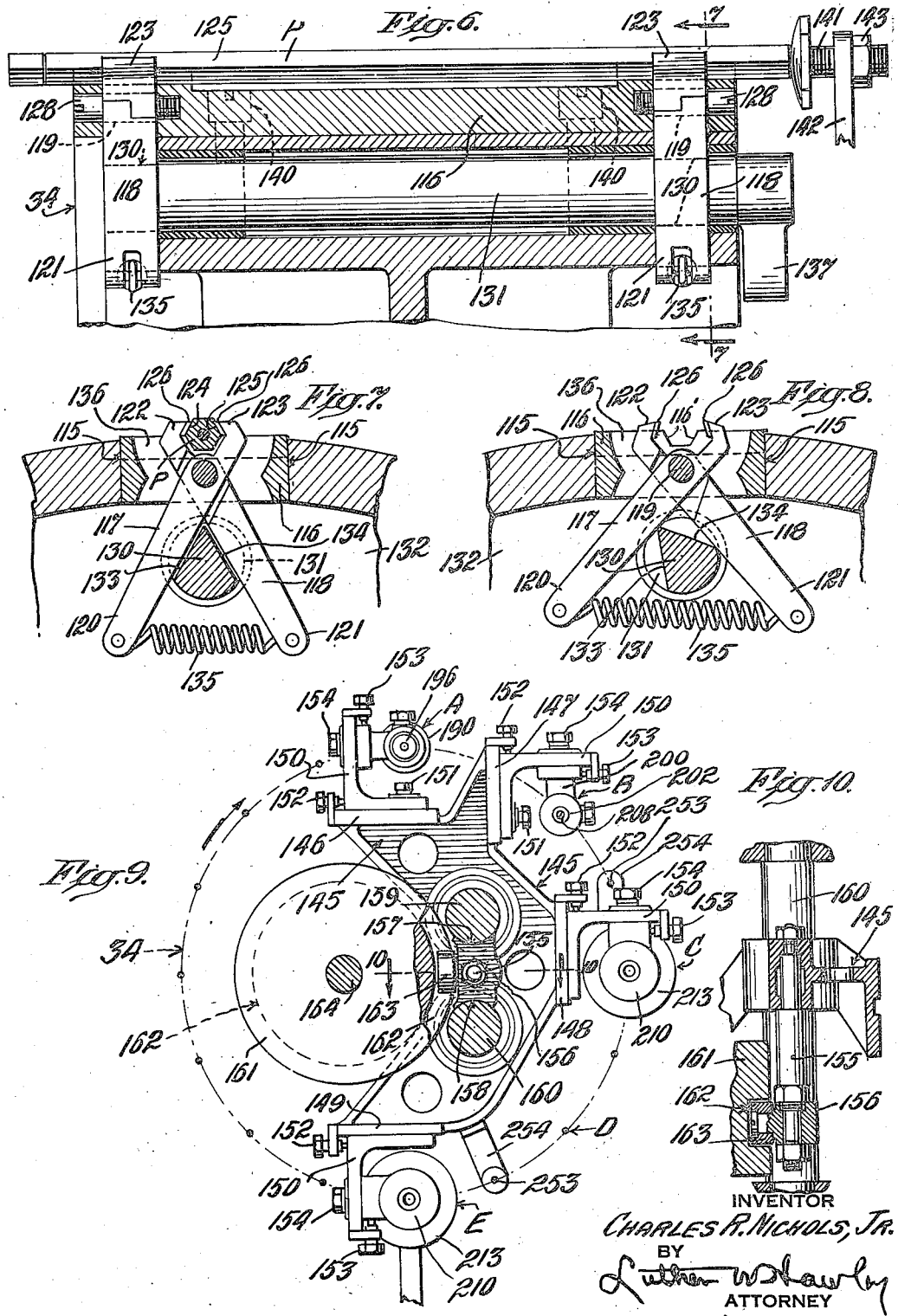

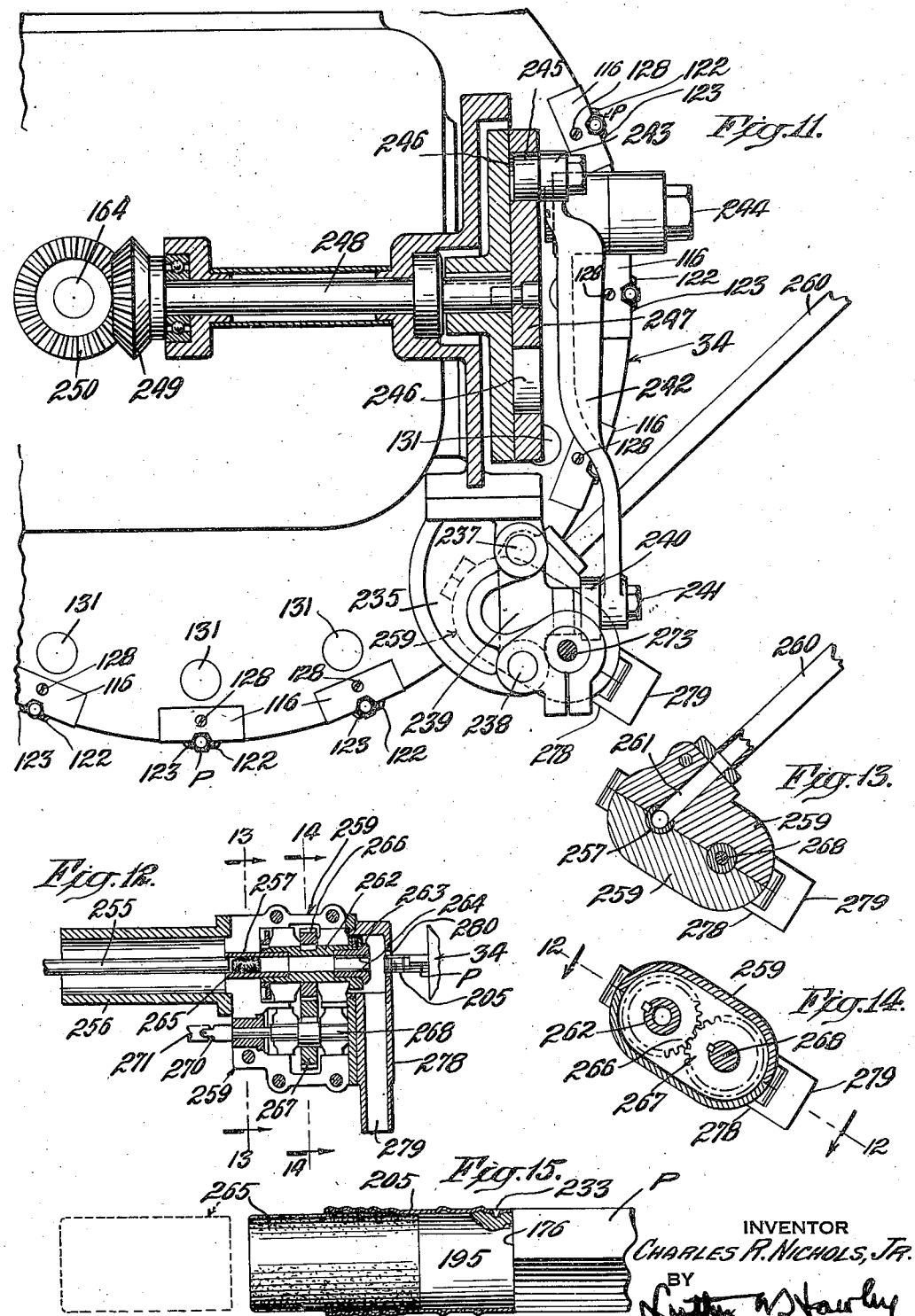

Aug. 6, 1946.  C. R. NICHOLS, JR  2,405,367
PENCIL MACHINE
Filed Feb. 6, 1943  8 Sheets-Sheet 7
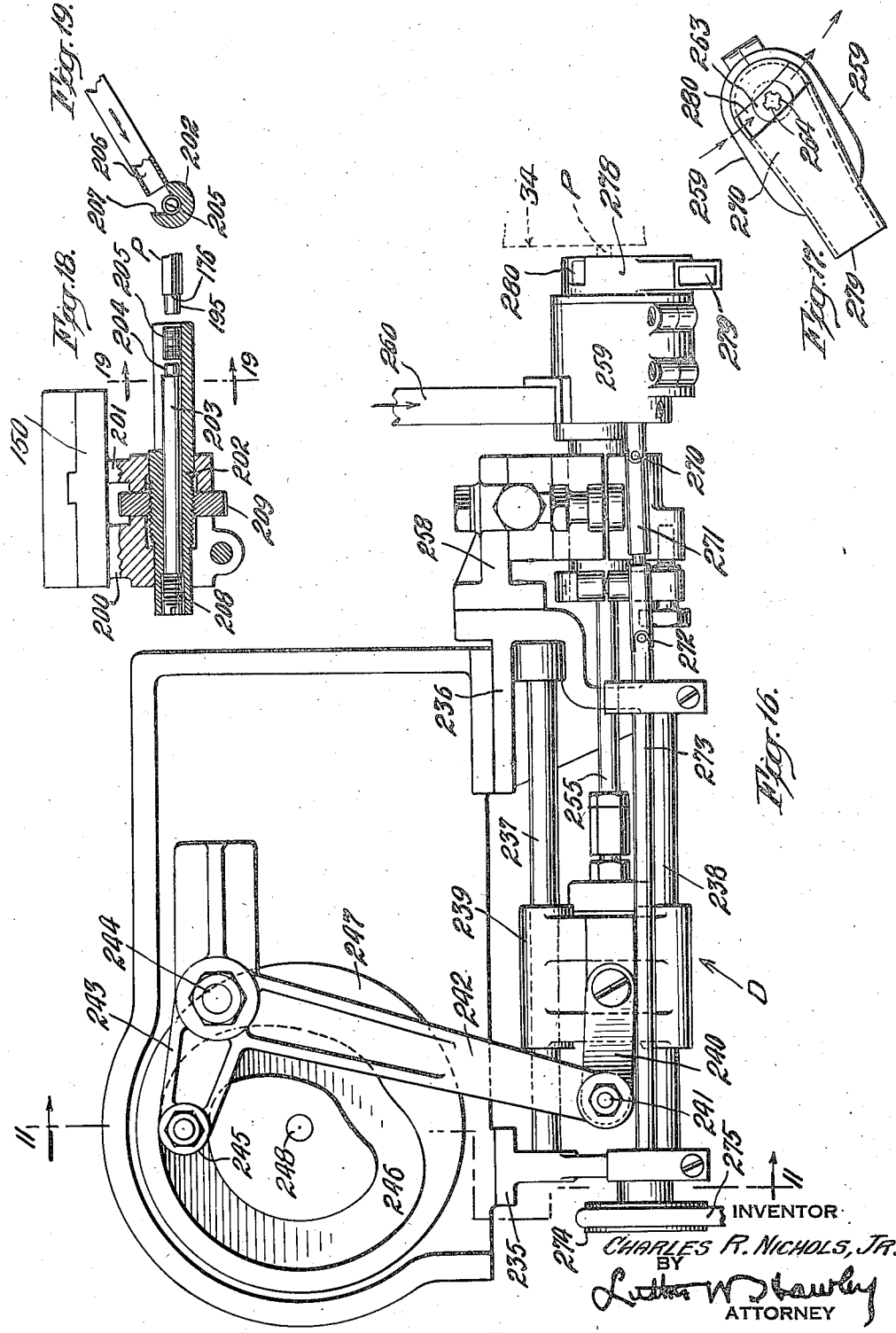
INVENTOR
CHARLES R. NICHOLS, JR.
BY
ATTORNEY

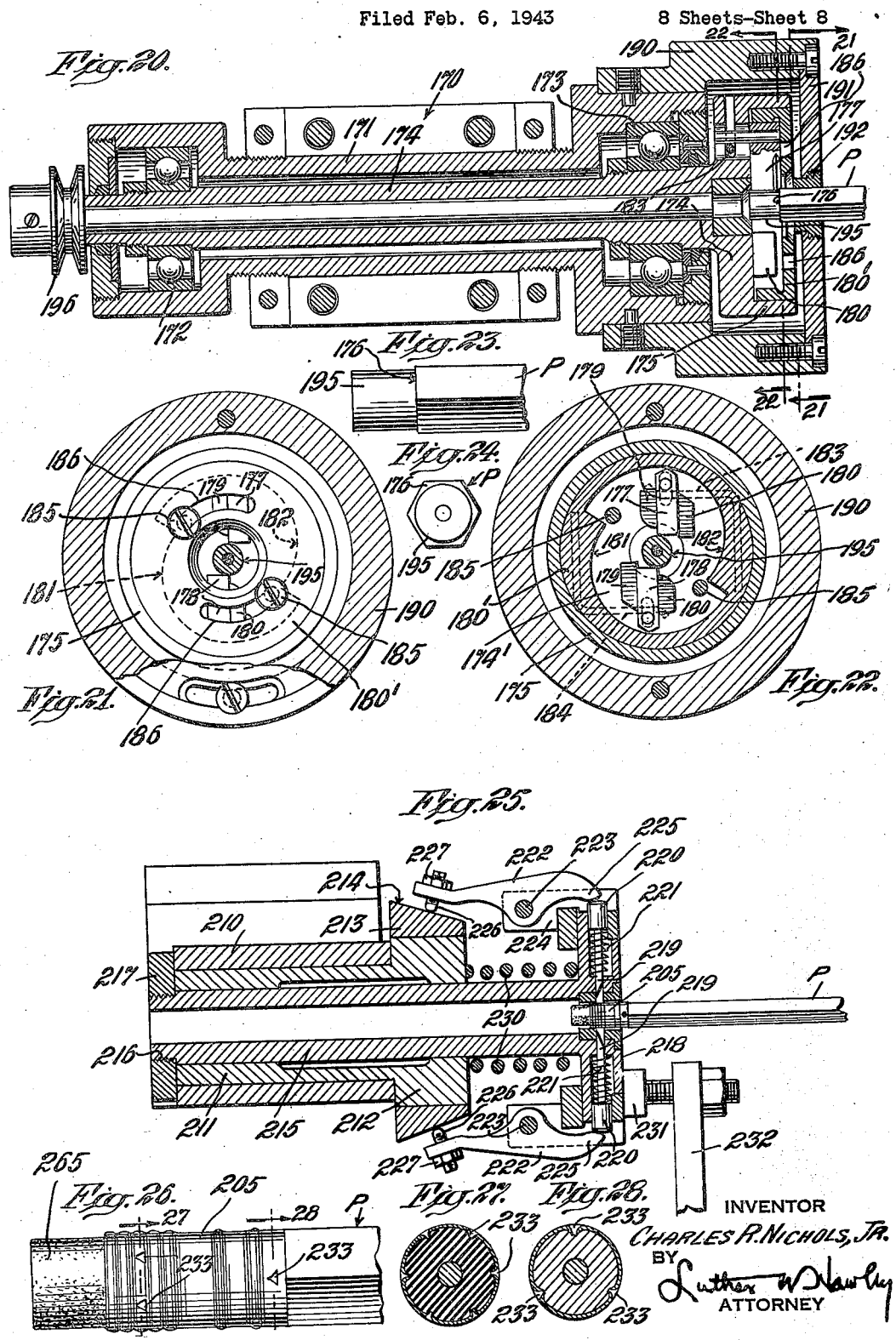

Patented Aug. 6, 1946

2,405,367

UNITED STATES PATENT OFFICE 2,405,367

PENCIL MACHINE

Charles R. Nichols, Jr., Jersey City, N. J., assignor to Joseph Dixon Crucible Company, Jersey City, N. J., a corporation of New Jersey Application February 6, 1943, Serial No. 475,045

13 Claims. (Cl. 144—3)

This invention relates to the manufacture of pencils and particularly to machines for securing caps or ferrules to pencils and for securing erasers or rubber plugs in the caps.

At the present time it is customary in the manufacture of pencils to place the pencils in one machine in which a ring is cut around the pencil near one end thereof. In a second machine the end portion beyond the ring is then reduced in diameter to form a shoulder and receives the cap or ferrule. The pencil is then taken to a third machine where the ferrule is secured on the end of the pencil and the plug is inserted in the ferrule. Thereafter the pencil is taken to a fourth machine where the rubber plug is secured in the ferrule.

The method above described is laborious, time consuming and expensive, and the machines utilized take up a large amount of space.

This invention has for its salient object to provide a single machine mechanism so coordinated and so timed that successive operating units perform all of the above operations efficiently and quickly, thereby conserving time, labor and space.

Another object of the invention is to provide means in a machine of the character described for rigidly holding and accurately positioning pencils for the successive operations thereon.

Another object of the invention is to provide accurate and positive positioning means for correctly positioning the pencil carrying member or mechanism whereby the successive operations can be performed on the pencils.

Another object of the invention is to provide means for accurately, longitudinally positioning the pencils on the pencil carrying member.

Another object of the invention is to provide signal means for indicating to the operator when certain operations have not been carried out, as for instance when a cap or ferrule has not been placed on the pencil or when no plug has been inserted in the ferrule.

Another object of the invention is to provide improved and simple and efficient mechanism for forming the reduced end and shoulder on the pencil to receive the cap or ferrule.

Another object of the invention is to provide in a machine of the character described, simple, practical and efficient mechanism for applying the rubber plugs to the caps or ferrules.

Another object of the invention is to provide means for automatically stopping the machine in the event that two plugs are pushed by the plug feeding means toward the pencil or in case the pencil is pushed in its clamps as the plug or plugs are fed.

Further objects of the invention will appear from the following specification taken in connection with the drawings which form a part of this application and in which Fig. 1 is an end elevation, partly in section, of a machine constructed in accordance with the invention;

Fig. 4 is an enlarged sectional elevation taken substantially on line 4—4 of Fig. 2 and looking in the direction of the arrows;

Fig. 6 is an enlarged sectional elevation taken substantially on line 6—6 of Fig. 4, looking in the direction of the arrows;

Fig. 7 is a sectional elevation taken substantially on line 7—7 of Fig. 6, looking in the direction of the arrows, the pencil clamping means being closed or in operative position;

Fig. 8 is a sectional elevation similar to Fig. 7 but showing the clamping means in open position;

Fig. 9 is an elevational view showing the frame or carrier for a plurality of the operative mechanisms which operate to form the shoulder on the pencil, apply the ferrule thereto, secure the ferrule, and secure the plug in the ferrule;

Fig. 10 is a sectional elevation taken substantially on line 10—10 of Fig. 9;

Fig. 11 is an enlarged elevation, partly in section, showing the plug applying means and operating mechanism therefor, this view being taken substantially on line 11—11 of Fig. 16, looking in the direction of the arrows;

Fig. 12 is a sectional elevation of the means for feeding and applying the plug to the ferrule, this view being taken substantially on line 12—12 of Fig. 14, looking in the direction of the arrows;

Figures 3, 29, 30:
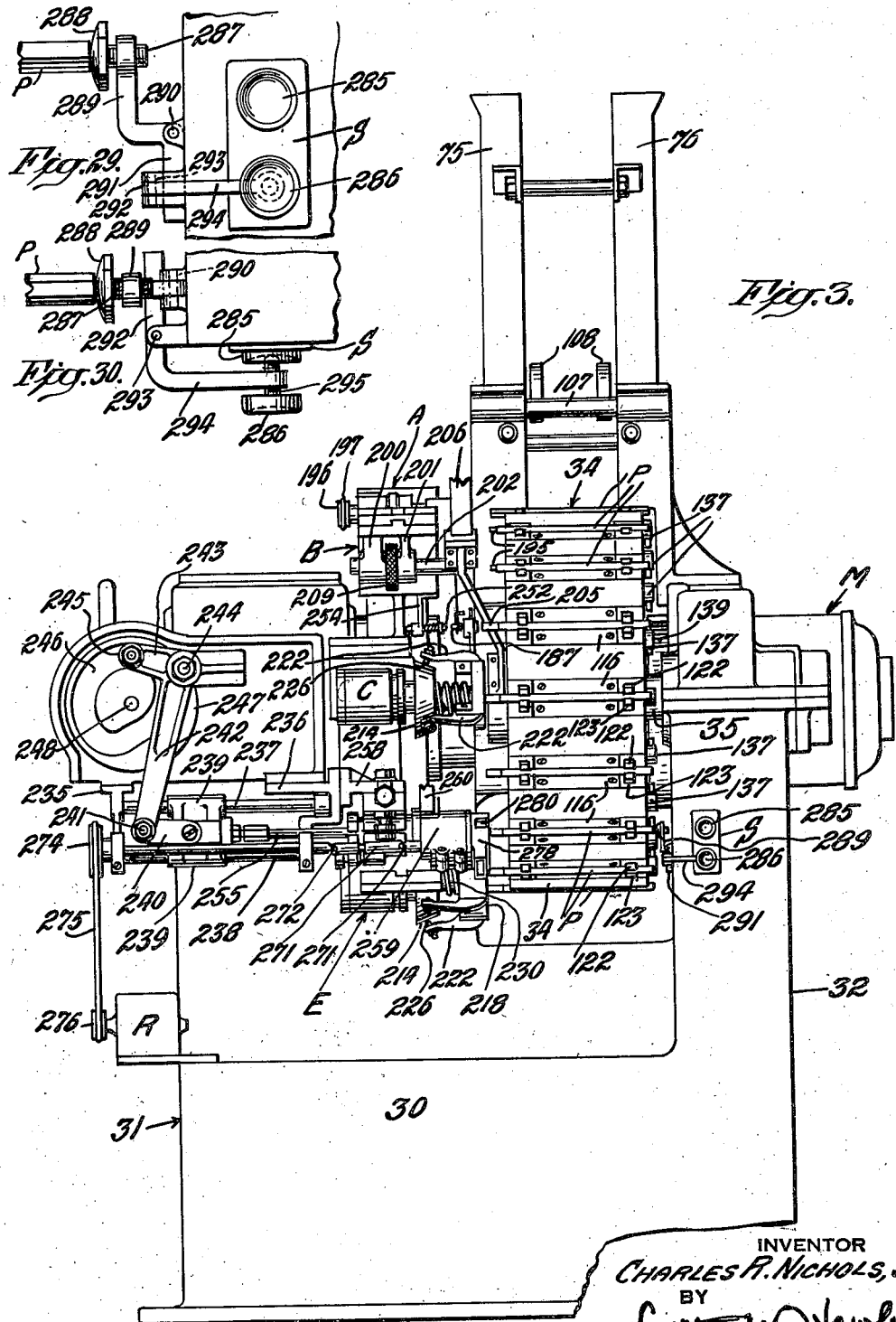
Fig. 3 is a front elevation of the machine.

Figs. 13 and 14 are sectional elevations through the plug applying mechanism, these views being taken substantially on lines 13—13 and 14—14 of Fig. 12, looking in the direction of the arrows;

Fig. 15 is an enlarged view, partly in section, showing one end of the pencil with the ferrule and plug secured thereto;

Fig. 16 is a front elevation of the operating mechanism for the plug applying means shown in Fig. 11;

Fig. 17 is an end elevation of the mechanism shown in Fig. 12 and also shown at the right hand end of Fig. 16;

Fig. 18 is an elevational view, partly in section, of the bracket and means carried thereby for feeding the ferrule on the reduced end or shouldered end of the pencil;

Fig. 19 is a sectional elevation taken substantially on line 19—19 of Fig. 18, looking in the direction of the arrows;

Fig. 20 is an enlarged sectional elevation taken through the mechanism for forming the reduced end and shoulder on the pencil;

Figs. 21 and 22 are sectional elevations taken substantially on lines 21—21 and 22—22 of Fig. 20, looking in the direction of the arrows;

Fig. 23 is an elevational view of one end of the pencil showing the reduced or shouldered portion thereof;

Fig. 24 is an end elevation of the end portion shown in Fig. 23;

Fig. 25 is a sectional elevation illustrating the pricking mechanism for forming indentations in the ferrule to secure the ferrule to the pencil and to secure the plug in the ferrule;

Fig. 26 is an elevational view, on an enlarged scale, showing the end of the pencil with the ferrule and plug secured thereon;

Figs. 27 and 28 are transverse sectional elevations taken substantially on lines 27—27 and 28—28 of Fig. 26, looking in the direction of the arrows;

Fig. 29 is an elevation of automatic stop control mechanism;

Fig. 30 is an elevation taken at right angles to Fig. 29; and

Fig. 31 is a sectional elevation, somewhat diagrammatic, showing signal mechanism for indicating improper operation of the machine as, for instance, when no ferrule or cap has been placed on the pencil or no plug has been inserted in the cap.

The invention briefly described consists of a machine for securing ferrules and plugs to pencils. The pencils are fed one at a time to pencil clamping means on a movable carrier and the carrier is intermittently moved by accurate and positive positioning means to successive stations at which the shouldering mechanism forms a reduced end and shoulder, the ferrule is forced on the reduced end of the pencil, the ferrule is secured thereon by suitable securing mechanism, such as pricking means, the rubber plugs are placed in the ferrules and the plugs are secured therein by suitable mechanism, such as pricking means. In addition to the broad combination of mechanisms so coordinated and so timed as to successively perform the operations described at successive stations of the pencil carrying means, the invention includes specific improvements in the shouldering mechanism, pencil carrier positioning means, and plug applying mechanism.

The invention furthermore includes signal devices for indicating to the operator an improper operation of the mechanism as when no cap or ferrule has been applied to the pencil or when no plug has been inserted in the ferrule.

Moreover, automatic stop mechanism is provided for stopping the machine when more than one plug has been fed to the ferrule.

Further details of the invention will appear from the following description.

Figure 1:
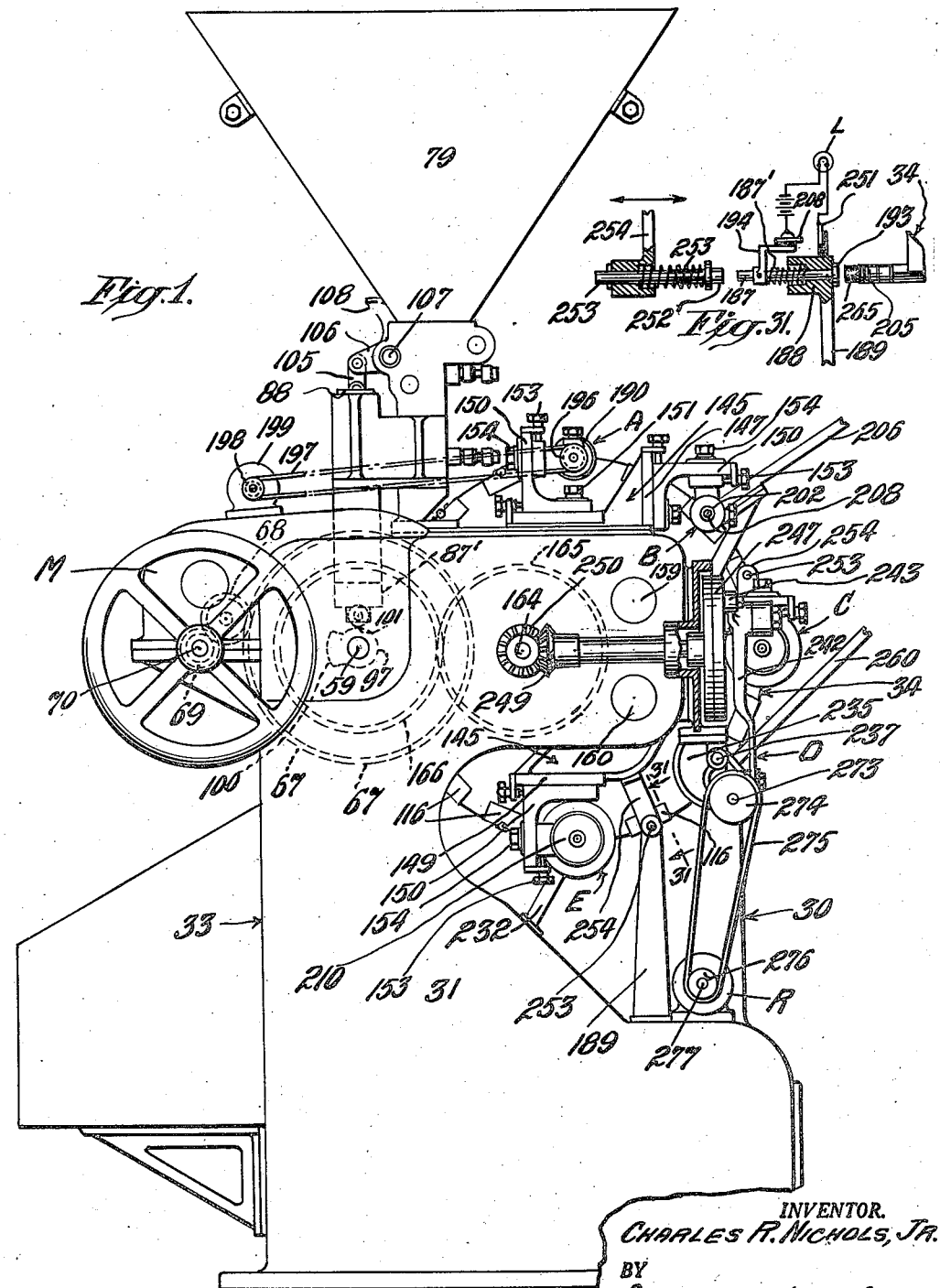
Figure 2:
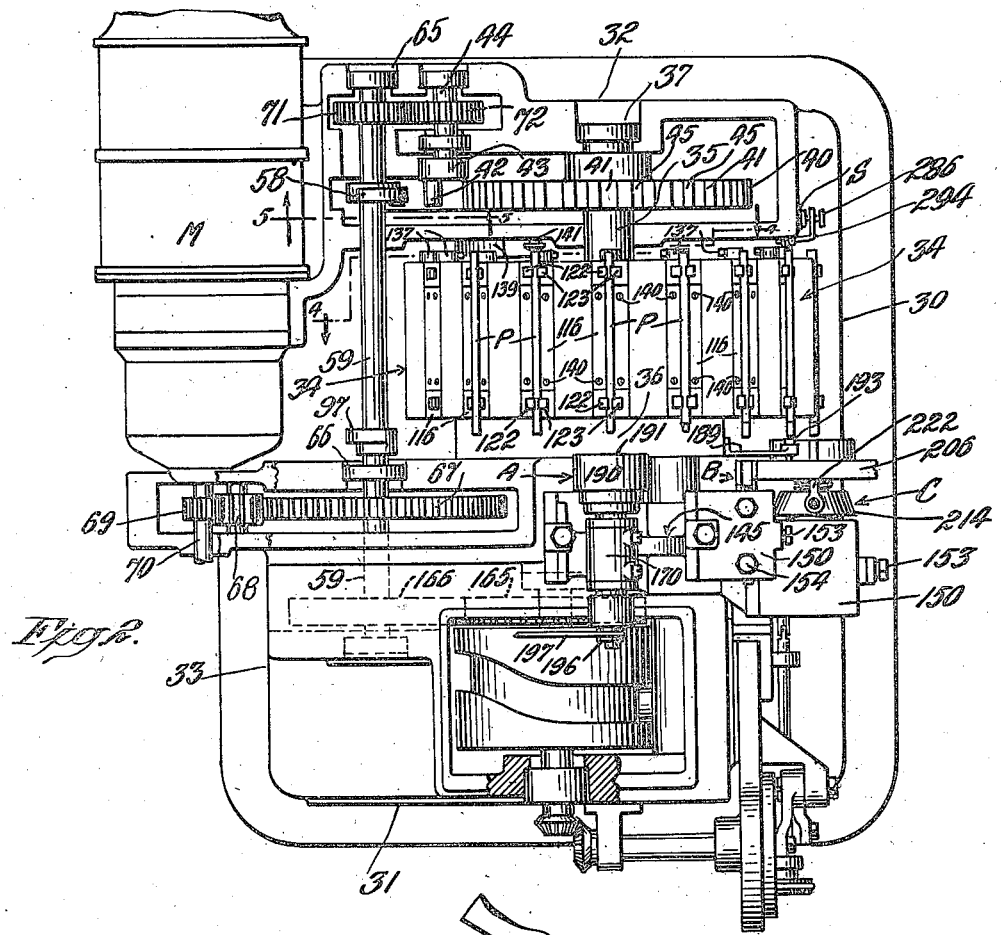
Fig. 2 is a top plan view of the machine shown in Fig. 1.

In the embodiment of the invention illustrated in the drawings, the machine frame illustrated particularly in Figs. 1 to 3 inclusive is substantially rectangular in shape and comprises a front 30, sides 31 and 32, and a rear 33.

During the operation of the machine the pencils are supported and moved to successive positions on a rotatably mounted drum 34 which is carried by a shaft 35 mounted in suitable bearings 36 and 37. The drum is particularly illustrated in Figs. 2 to 5 inclusive. The drum is rotated intermittently by Geneva mechanism including a Geneva wheel 40 having a plurality of radially disposed slots 41. These slots receive a pin or roller 42 carried by an arm 43 mounted on a shaft 44. As the shaft 44 is rotated in the direction of the arrow shown in Fig. 5, the roller 42 enters one of the slots 41 and feeds or rotates the wheel 40 through one increment of movement, this increment consisting of the arc between successive notches 41.

Since the various mechanisms which perform operations on the pencil are arcuately disposed around the axis of the shaft 35 of the drum 34, it is necessary that the movement of the drum by the Geneva wheel be absolutely accurate for otherwise the mechanisms will not register with the pencils. This accuracy is obtained by means of the structure illustrated in Fig. 5. It will be noted that the periphery of the Geneva wheel 40 has extending thereinto, intermediate the slots 41, another series of slots 45. Each of the slots 45 has one side 46 disposed radially with respect to the axis of the shaft 35, the other side of the slot indicated at 47 being tapered or inclined with respect to the side 46.

As the roller 42 leaves one of the slots 41, one of the slots 45 will receive an end 48 of a plunger 50 slidably mounted in a guide frame 51. The plunger 50 has a slot 52 which receives one end 53 of a bell crank lever comprising arms 54 and 55, the lever being mounted on a pivot 56. A spring 57 engages the outer end of the plunger 50 and tends to press the plunger inwardly. The plunger is withdrawn from the slot 45 by the bell crank lever which is controlled by a cam 58 carried by a shaft 59 and engaging a roller 60 mounted on the arm 55 of the bell crank lever. It will be noted that as the roller 60 is engaged by the enlarged portion of the cam, the bell crank lever will be swung in a clockwise direction, thereby moving the plunger 50 and withdrawing the end 48 of the plunger from the slot 45. However, as the roller engages the circular portion of the cam, the action of the spring 57 will force the end 48 of the plunger into the slot 45.

The end portion 48 of the plunger 50 has a tapered side 62 which engages the side 47 of the slot 45. This engagement positions the Geneva wheel 40 and the plunger when seated in the slot 45 has its other surface 63 disposed in contact with the wall 46 of the slot 45. By means of this construction, any wear caused by this centering or positioning contact occurs on the tapered plunger surface 62 and wall 47 and no wear occurs between the plunger surface 63 and the slot surface 46.

The shafts 44 and 59 are rotated in the following manner: Shaft 59 is mounted in suitable bearings in the machine frame, as shown at 65 and 66. This shaft has mounted thereon a gear 67 which meshes with an idler gear 68 which meshes with a gear 69 carried by the shaft 70 of a motor M.

Shaft 59 drives the shaft 44 by means of intermeshing gears 71 and 72 carried respectively by shafts 59 and 44.

*Pencil hopper and pencil release and feeding means*

This mechanism is illustrated particularly in Figs. 3 and 4. The pencil hopper may be of any suitable construction and preferably comprises two sets of spaced, inclined strips or bars 75 and 76. The hopper has end walls 77 spaced apart the proper distance corresponding to the length of the pencils. The end portions of the pencils are supported by the bars 75 and 76. These bars extend downwardly in parallel relation, forming guide walls 78 and 79 between which the pencils are guided downwardly as shown in Fig. 4. The bottom pencil between the walls 78 and 79 is normally held from release by means of a hook 80 which is spring pressed by a spring 82 into operative position. The hook 80 is carried by an arm 83 of a bell crank lever which is pivoted at 81 and has an arm 84 provided with a bifurcated outer end 85. The bifurcated outer end 85 straddles a reciprocatable rod 86 and is adapted to be engaged by an adjustable stop or nut 87 which is threaded on a portion of the rod 86. The rod is slidably mounted in lugs 87' and 88 carried by a frame member 89. The rod 86 also has an adjustable stop or nut 90 mounted on a threaded portion 91 and engageable by a bifurcated end 92 of a lever comprising arms 93 and 94 pivotally mounted at 95 and normally actuated in an anticlockwise direction, viewing Fig. 4, by a spring 95'.

The arm 94 has disposed at the outer end thereof, a lug 96 which is adapted to engage the bottom pencil disposed between the walls 78 and 79 when this pencil is released by the hook 80, and to push this pencil laterally to be engaged by clamping means carried by the drum 34, as hereinafter described.

The rod 86 is held downwardly in engagement with a cam 97 by a spring 98 which engages a threaded nut or collar 99 carried by the rod 86, and at its other end engages the rod guide 88. The cam 97 has a projection 100 which upon engagement with a roller 101 carried by the bottom of the rod, lifts the rod 86 and causes the stop 87 to engage the end 85 of the bell crank lever 83, 84, thereby releasing the hook 80. As the rod is raised, the stop 90 will move away from the bifurcated end of the lever 93, 94 permitting the spring 95 to swing the lever in an anticlockwise direction, thus causing the lug 96 to engage and eject the lower pencil disposed between the walls 78, 79.

At its upper end the rod 86 has pivoted thereto a link 105 which is also pivoted to an arm 106 pivotally mounted on a spindle 107. The arm 106 has connected thereto an arm 108 having an outer surface 109 which agitates and alines the pencils disposed in the hopper.

The cam 97 which operates the rod 86 is mounted on the shaft 59.

Pencil holding clamps

This mechanism is illustrated particularly in Figs. 3, 4 and 5 to 8 inclusive. The periphery of the drum is provided with a plurality of recesses 115 which receive blocks 116 having grooves 116' for receiving the pencils. The blocks 116 are disposed radially with respect to the axis of the drum.

Obviously it is necessary that the pencils be positioned on the drum in the blocks 116 with absolute accuracy and that they be firmly and rigidly held in this position, otherwise the various operating mechanisms will not be properly alined to perform their operations. This is accomplished by rigidly clamping each pencil as it is disposed in the groove 116', the clamping means consisting of two sets of clamps disposed adjacent the ends of the pencils.

As shown particularly in Figs. 4, 6, 7 and 8, each clamp comprises pivoted levers 117 and 118 mounted on a pivot 119. The levers 117 and 118 comprise arms 120 and 121 disposed on one side of the pivot 119, and jaws 122 and 123 disposed above or on the opposite side of the pivot 119. These jaws are properly shaped to engage the inclined surfaces 124 and 125 of a hexagonal pencil. The engaging surfaces of the jaws are preferably provided with pads 126 of friction material.

In Fig. 6 it will be noted that the pivots 119 are formed by pivot pins 128 threaded into the block 116.

The lever arms 120 and 121 are controlled by a cam 130 formed on a spindle 131 pivotally mounted in webs 132 carried by the drum. The cam 130 has angularly disposed surfaces 133 and 134 dimensioned to fit between the arms 120 and 121 when the clamping jaws are closed, as shown in Fig. 7. The clamping jaws are held in closed position by means of a spring 135 which engages the outer ends of the arms 120 and 121. The blocks 116 are slotted, as shown at 136, to receive the levers and clamping jaws.

Each spindle 131 carries on its outer end a lug 137 which is adapted to engage an arcuate ledge or cam 139 fixed to the frame and disposed within the periphery of the drum. As shown in Fig. 4, when the lugs 137 are in engagement with the arcuate ledge or cam 139, the spindle 131 will be swung to the position shown in Fig. 8 in which the cam 130 will hold the lever arms 120 and 121 at their outer limits of movement, thereby opening the jaws 122 and 123. However, as the lugs 137 ride off the upper edge of the ledge or cam 139, the springs 135 will close the levers and jaws, causing the jaws to grip the pencil. As shown in Fig. 6, the pencil P extends beyond the ends of the block and drum. The blocks 116 are firmly held in position by screws 140.

In order to insure the proper longitudinal position of the pencils in the clamps, an adjustable headed stud 141 is threaded into a fixed member 142 and is held in adjusted position thereon by a lock nut 143. (See Fig. 6.) The head 144 is rounded and is engageable by the ends of the pencils as the pencil carrying drum is rotated. Thus the pencils are pushed longitudinally in the jaw clamps if they project too far to the right, viewing Fig. 6.

Tool carriage and control means therefor

This mechanism is particularly illustrated in Figs. 2, 3, 9 and 10. The various operating mechanisms which perform the operations on the pencils hereinbefore set forth are indicated on Fig. 1 as follows:

A—Mechanism for reducing end of pencil to form a shoulder.
B—Ferrule applying mechanism.
C—Ferrule securing means.
D—Plug inserting mechanism.
E—Plug securing mechanism.

Of the five mechanisms above enumerated, A, B, C and E are mounted on a reciprocatable carriage or frame 145 illustrated particularly in Fig. 9. The frame or carriage 145 has formed thereon surfaces 146, 147, 148 and 149 on which the mechanisms A, B, C and E are respectively mounted. The mechanism A is carried by an angular bracket 150 adjustably secured by suitable clamps or studs 151 to the supporting surface 146. Adjusting means for the bracket is shown at 152. The mechanism A is adjusted on the outwardly extending arm of the bracket by a set screw or stud 153 and is clamped in position by securing means or nuts 154. Similar securing and adjusting means is provided for each of the mechanisms B, C and E carried by the carriage or frame 145 and need not be further explained.

Obviously adjustments must be provided in order that the mechanisms can be accurately alined with the pencils carried by the drum.

The carriage or frame 145 has secured thereto and extending laterally therefrom, a rod 155 on which is mounted a yoke 156 having arcuate portions 157 and 158 engaging a pair of rods 159 and 160 fixed to the frame of the machine. The yoke 156 is slidably mounted between the rods 159 and 160. The position of the yoke and of the frame or carriage 145 is determined by a cam 161 having a cam groove 162 which receives a cam roller 163 carried by the yoke 156. The cam 161 is mounted on a shaft 164. Shaft 164 has also mounted thereon, as shown in Figs. 1 and 2, a gear 165 which meshes with a gear 166 carried by the shaft 59. The cam 161 is so designed and so timed that the frame or carriage 145 is moved toward the drum 34 after the drum has come to rest in each successive position of movement or station thereon.

As the carriage moves to operative position in the manner just described, the mechanisms A, B, C and E operate to perform their respective functions. Mechanism D, which inserts the plugs in the ferrules, is separately mounted and independently controlled in a manner hereinafter described.

*Mechanism for forming a reduced end and shoulder to receive ferrule*

This mechanism, which is designated A on Figs. 1 and 9, is illustrated particularly in Figs. 9, 20, 21 and 22. The mechanism above designated is mounted on the carriage 145 in the manner above described. In Fig. 20 the outer end of the tool bracket which carries the operative mechanism is shown at 170. This mechanism comprises a casing or sleeve 171 having ball bearings 172 and 173 which rotatably support a hollow shaft 174. One end of the shaft has formed on or secured to its outer end a disk 174' which in turn has formed on its outer end a flange 175. This flange forms a hollow drum for receiving adjustable knives which engage and cut the outer end of the pencil to reduce the outer diameter thereof and form a shoulder 176. The knives are shown particularly in Fig. 22 at 177 and 178. The knives are slidably mounted between guide blocks 179 and 180 secured to the disk 174'. Means is provided for adjusting the knives the proper distance apart to reduce the pencil to the desired diameter. A drum 180' is mounted within the flange 175 and has formed on the inner surface thereof oppositely disposed cams 181 and 182, these cams engaging the outer ends of the knives 177 and 178. The knives are held in engagement with the cams by springs 183 and 184. The drum 180' is clamped to the disk 174 by means of screws or studs 185 which are carried by the disk 174' and extend through arcuate slots 186 formed in the drum 180'.

From the showing in Fig. 22 it will be evident that as the drum 180' is arcuately adjusted, the cams 181 and 182 which are disposed within the drum will adjust the knives toward or away from each other, as the case may be. When the knives have been properly adjusted, the screws or studs 185 are tightened, thereby securing the drum 180' in flexed relation to the disk 174' and clamping the cutter in position.

A casing 190 is secured to one end of the casing or sleeve 171 and a disk 191 is secured on the outer end of the casing 190. The disk 191 has a central opening therethrough in which is mounted a bushing 192 which receives the pencil P.

It will be obvious that as the carriage or frame 145 is reciprocated in a direction toward the drum, that the knives 177 and 178 will turn down or reduce the diameter of the end of the pencil forming a cylindrical portion 195 and the shoulder 176 for receiving the ferrule.

The knives, disk 174' and shaft 174 are driven in any suitable manner, as by a pulley 196 and belt 197 from a pulley 198 driven by a motor 199.

*Cap or ferrule applying mechanism*

This mechanism is designated B on Figs. 1 and 9 and is illustrated particularly in Figs. 9, 18 and 19. As shown in Fig. 18, the mechanism B is carried by a pair of arms 200 and 201, which in turn are formed on the bracket shown in Fig. 9. These arms adjustably carry a sleeve 202 which is threaded therein and is adjustable axially by a nut 209 disposed between arms 200 and 201 in which is positioned a rod 203 having a reduced end 204 adapted to enter one end of a ferrule or cap 205. The ferrules are fed downwardly through a chute 206 and the sleeve 202 is cut away, as shown at 207, to receive the ferrules. The position of the rod 203 in the sleeve 202 can be adjusted by a set screw 208.

As the reduced cylindrical end of the pencil is positioned opposite the station B or opposite the ferrule applying mechanism B, the carriage or frame 145 will be moved toward the drum, thereby causing the rod 203 and sleeve 202 to push the ferrule longitudinally on the reduced end 195 of the pencil P.

In order to indicate to the operator any failure of the ferrule applying mechanism at position B, and above described, means is provided at a point between stations B and C.

This mechanism is indicated on Figs. 1, 2 and 9 and is shown diagrammatically in Fig. 31. As there shown, the mechanism consists of a plunger 187 slidable in a head 188 of a fixed bracket 189. The plunger 187 has a head 193 alined with the end of a pencil on which a ferrule has been placed. Plunger 187 is normally retracted to the position shown in Fig. 31 by a spring 187'.

A bracket 194 is secured to the plunger 187 and is movable therewith. The bracket 194 carries a contact member 208 which is insulated from the bracket 194 and is adapted to close a signal circuit through a signal device L by engaging a fixed contact member 251 when the plunger moves beyond a predetermined limit of movement—i. e., beyond the point where head 193 will engage the end of a ferrule on a pencil. Thus, if no ferrule has been applied, the plunger will not be arrested by the ferrule but can move sufficiently to cause the engagement of contact members 208 and 251, closing the signal or alarm circuit.

The plunger 187 is actuated intermittently in any suitable manner, the operation being synchronized with the step by step carrier feed. As shown, the plunger 187 is engaged by the head 252 of a plunger 253 slidably mounted in an arm 254 and actuated toward plunger 187 by a spring 253. Thus, as arm 254 is moved alternately in the direction of the arrows, the plunger head 252 will engage and move plunger 187 and if no ferrule has been applied the alarm or signal will be given.

*Ferrule securing mechanism*

This mechanism in designated C on Figs. 1 and 9 and is illustrated particularly in Figs. 25, 26 and 27. The prick-punch mechanism for securing the ferrule is indentical with the mechanism E for securing the plug in the ferrule and, therefore, one showing of this mechanism is sufficient. Fig. 25 shows the mechanism in position to secure the plugs but will be described in connection with the ferrule securing mechanism. The ferrule securing mechanism is carried by a tubular casing or sleeve 210, which in turn is carried by the bracket mounted on the supporting surface 148 of the frame or carriage 145. The tubular casing 210 houses a sleeve 211 having an extension 212 on one end thereof on which is mounted a conical cam 213 having a tapered surface 214. Within the sleeve 211 is mounted a hollow shaft or sleeve 215 which is threaded at one end, as shown at 216, to receive a nut 217. The nut 217 engages the outer ends of the sleeves 211 and 210.

The hollow shaft or sleeve 215 has formed on its outer end a laterally extending disk 218 within which are slidably mounted prick-punch members 219 having heads 220 at the outer ends thereof. Springs 221 actuate the prick-punch members 219 outwardly and these members are forced inwardly by levers or rockers 222 pivotally mounted at 223 on lugs 224 carried by the disk 218. These rockers or levers have ends 225 which engage the heads 220 and at their other ends the rockers or levers 222 are provided with adjustable screws 226 which are held in adjustment by lock nuts 227. The inner ends of the screws 226 engage the inclined surface 214 of the cam 213. The sleeve or hollow shaft 215 is slidable in the sleeve 211. These parts are held in the relative position shown in Fig. 25 by a spring 230 which is disposed between the extension 212 of the sleeve 211 and the opposed surface of the disk 218.

When the carriage 145 moves toward the drum 34, the outer surface of the disk 218 will engage an adjustable stop 231 carried by a fixed bracket 232 when the prick-punches 219 are disposed over the ferrule 205. When the disk engages this adjustable stop, the cam 213 will continue to move, thereby causing the rockers or levers 222 to move in a direction to force the ends 225 thereof inwardly, thereby forcing the prick-punches into engagement with the ferrule, which will cause the ferrule to be pressed inwardly, as shown at 233 in Figs. 26 and 28.

*Plug inserting mechanism*

This mechanism is illustrated particularly in Figs. 11 to 17 inclusive. As shown in Figs. 11 and 16, the machine frame has secured thereto brackets 235 and 236 which carry a pair of supporting posts 237 ad 238. A yoke 239 is slidably mounted on the posts or rods 237 and 238 and has pivoted thereto a link 240 which is also pivoted at 241 to a bell crank lever comprising arms 242 and 243, this lever being mounted on a fixed pivot pin 244. The other end of the arm 243 has secured thereto a roller 245 which is mounted in a cam groove 246 of a cam 247, which in turn is secured to a shaft 248. The rear end of the shaft 248 carries a bevel gear 249 which meshes with a gear 250 mounted on the shaft 164.

The yoke 239 has secured thereto a reciprocatable rod or pin 255 which extends through a casing 256 and is adapted to be projected into a sleeve 257.

A bracket 258 which is connected to the bracket 236 carries a casing 259 to which is secured a chute 260 through which the plugs are fed into a conduit 261 and to the sleeve 257.

A fixed sleeve 257 extends into a hollow shaft or sleeve 262 rotatably mounted in the casing 259. The hollow shaft or sleeve 262 also carries a sleeve 263 which, as shown in Fig. 17, is irregular in outline and has inwardly projecting portions or lands 264 which are adapted to engage the outer surface of the rubber plug 265.

The hollow shaft 262 has mounted thereon a gear 266 which meshes with a gear 267 carried by a shaft 268 which is also mounted in the casing 259. The shaft 268 extends through the wall of the casing and is connected by a coupling 270 to a shaft 271 which, in turn, is connected through a coupling 272 to a shaft 273. The shaft 273 has a pulley 274 on its outer end which, as shown in Fig. 1, is connected by a belt 275 to a pulley 276 carried by a shaft 277 of a motor R.

As the cam 247 is rotated, the bell crank lever 243, 242 will reciprocate the rod or pin 255, thus feeding the rubber plugs through the sleeve 257 and hollow shaft 262 into the clutch sleeve 263. When the plugs enter the clutch sleeve 263 and are fed therethrough by the pin or rod 255, they will be rotated. The casing 259, as shown particularly in Figs. 12, 16 and 17, is provided with a cover 278 having an arcuate slot 280. The arc of this slot is concentric with the axis of rotation of the drum 34 and the radius is substantially equal to the radius on which the pencils are carried by the drum are rotated. Thus, as shown in Fig. 12, the end of the pencil with the ferrule thereon enters the arcuate slot 280 and comes to rest opposite the axis of the reciprocatable pin or rod 255. Thus the rubber plugs 265 are pushed through the clutch sleeve 263 into the ferrule and are rotated as they enter the ferrule, thus facilitating the insertion of the plug in the ferrule.

The cover 278 has an outlet spout 279 for the discharge of small pieces of rubber detached from the plugs as they are inserted in the ferrules.

An alarm or signal device, exactly similar to that used for checking the ferrule application to the pencil, is located on the machine intermediate stations D and E, as illustrated in Fig. 1 and in detail in Fig. 31. Further explanation of this mechanism is unnecessary. When no plug has been inserted in the ferrule the signal device circuit is energized and the signal is given.

*Plug securing mechanism*

The plugs are secured by prick-punches identical with the punches used to secure the ferrules to the pencil and above described in connection with the ferrule securing mechanism. This structure is illustrated in Figs. 25 to 28 inclusive and from Fig. 27 it will be noted that in the embodiment of the invention illustrated, six punches are used for securing the plug, whereas, only three punches are used to secure the ferrules. This structure is designated on Figs. 1 and 9 at E but need not be further described.

In order to prevent damage to the machine in case two plugs are fed toward the cap or ferrule and the pencil is thus pushed toward the right, viewing Figs. 2 and 3, automatic stop means is provided, as shown in Figs. 2, 3, 29 and 30.

A control switch S has a starting button 285 and a stop button 286 which control the motor circuit for motor M. A headed stud 287 has a head 288 disposed in alinement with the pencil positioned to receive the plug. The stud 287 and head 288 are disposed opposite the end of the pencil remote from the end having the cap or ferrule.

Stud 287 is adjustably threaded into one end 289 of a lever mounted on a fixed pivot 290. The other end 291 of the lever is disposed in engagement with one end 292 of a lever pivoted on a fixed pivot 293. The outer end 294 of the last named lever has a stud 295 adjustably threaded therein, the inner end of the stud 295 being disposed opposite the stop button 286.

If the pencil is pushed to the right, viewing Figs. 29 and 30, as in case two plugs are fed by rod 255 (Fig. 12), or for any other reason, the lever 289, 291 will be swung in a clockwise direction, viewing Fig. 29, thus swinging lever 292, 294 in an anti-clockwise direction (Fig. 30) and causing stud 295 to push the stop button 286 and stop the machine.

Operation

The operation of the machine may be briefly summarized as follows: The pencils are fed downwardly from the hopper in the manner shown in Fig. 4 to the grooved supporting blocks 116 in which they are clamped by the clamp 117, 118 as the lugs 137 which control the clamps ride off of the ledge 139. The adjustable stud 141 (Fig. 6) insures the accurate longitudinal positioning of the pencils in the clamps.

Figure 5:
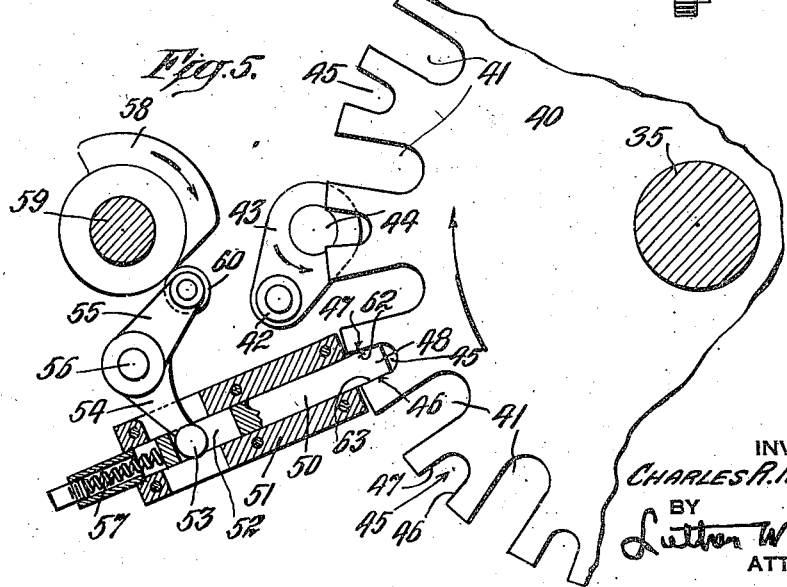
Fig. 5 is an enlarged elevation, partly in section, taken substantially on line 5—5 of Fig. 2, looking in the direction of the arrows.

The drum is fed intermittently in a step by step movement by the Geneva wheel, the exact increment of feeding movement being determined positively by the operation of the plunger 50 shown in Fig. 5.

In the particular form of the invention shown, the pencils are operated on by the various mechanisms A, B, C, D and E in every other position or station thereof. In other words, the blocks 116 are spaced apart on the drum one half the distance between successive stations A, B, etc. At station A the rotary cutting knives shown particularly in Figs. 20 to 22 inclusive are moved into operative position by the movement of the carriage or frame 145 and form the reduced end 195 on the pencils P and the shoulder 176.

The movement of the frame or carriage 145 during the stops between the intermittent movements of the drum also moves the cap or ferrule applying means, shown in Figs. 18 and 19, to operative position to apply the ferrules to the reduced portions 195 of the pencil P. At the next station the ferrules are secured by the prick-punch mechanism shown in Fig. 25, although it should be noted that in this figure the punches are shown in position to secure the plugs in the ferrules.

After the ferrules have been secured in the manner described, the plugs are fed or inserted in the ferrules in the manner shown in Figs. 11 to 17 inclusive. The plug applying mechanism is the only operative mechanism not carried by and moved with the frame 145. However, if desired, all of the mechanisms, including the plug applying mechanism, could be carried by the frame 145. The end of the pencil with the ferrule thereon enters the arcuate slot 280 and the plugs are fed through the clutch sleeve 263 by the pin 255 and are thus rotated during the feeding movement into the ferrule.

The automatic stop mechanism shown in detail in Figs. 29 and 30 operates to stop the machine in case the pencil is pushed through the clamps by the plug feeding operation.

After the plugs have been inserted, the prick-punch mechanism illustrated in Fig. 25 operates to form the indentations in the ferrule, thus securing the plug therein.

From the foregoing description it will be clear that a simple, practical and efficient machine has been provided for performing the various operations on the pencil, namely, forming the reduced end, applying and securing the ferrules thereto, and inserting and securing the plugs in the ferrules.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a machine of the character described, a carrier, means on the carrier for supporting and securing pencils in spaced relation with their ends overlapping one side of the carrier, operative means disposed at said side of the carrier and movable toward the carrier and operable in timed relation to the carrier operations for performing successive operations on the pencils, and means for intermittently moving the carrier to position said pencils at successive stations where said operations are to be performed, said intermittent moving means comprising means for moving the carrier through increments of movement and subsequent acting means for adjusting the carrier to insure the alinement of the pencils with said operative means.

2. In a machine of the character described, a carrier, means on the carrier for supporting and securing pencils in spaced relation with their ends overlapping one side of the carrier, operative means disposed at said side of the carrier and movable toward the carrier and operable in timed relation to the carrier operation for performing successive operations on the pencils, and means for intermittently moving the carrier to position said pencils at successive stations where said operations are to be performed, said intermittent moving means comprising a Geneva wheel, means engageable with said wheel to move the wheel through predetermined increments of movement, and subsequently acting means engageable with said wheel for adjusting the wheel and carrier to insure the accurate alinement of the pencils with the operative means.

3. In a machine of the character described, means for supporting and holding, in a predetermined position, a pencil with a ferrule secured thereon and projecting therefrom, and means disposed opposite said predetermined position for inserting a plug in said ferrule, said means including a rotating clutch sleeve for receiving the plug and for rotating the plug and means for pushing the plug through said sleeve into the ferrule.

4. In a machine of the character described, means for supporting and holding, in a predetermined position, a pencil with a ferrule secured thereon and projecting therefrom, and means disposed opposite said predetermined position for inserting a plug in said ferrule, including a casing having a hollow shaft, a plug chute leading to said hollow shaft, a clutch sleeve carried by said shaft and adapted to receive the plugs, means for feeding the plugs through the shaft into the clutch sleeve and through the sleeve into a ferrule, and means for rotating said hollow shaft and clutch sleeve.

5. In a machine of the character described, means for supporting and holding, in a predetermined position, a pencil with a ferrule secured thereon and projecting therefrom, and means disposed opposite said predetermined position for inserting a plug in said ferrule, including a casing having a hollow shaft, a plug chute leading to said hollow shaft, a clutch sleeve carried by said shaft and adapted to receive the plugs, means for feeding the plugs through the shaft into the clutch sleeve and through the sleeve into a ferrule, and means for rotating said hollow shaft and clutch sleeve, said casing having an opening for receiving the ferrule whereby the plug can be inserted therein.

6. In a machine of the character described, a carrier, means on the carrier for supporting and securing pencils in spaced relation with their ends overlapping one side of the carrier, operative means disposed at said side of the carrier and movable toward the carrier and operable in timed relation to the operation of the carrier for performing successive operations on the pencils, and means for intermittently moving the carrier to position said pencils at successive stations where said operations are to be performed, said intermittent moving means comprising means for moving the carrier through increments of movement and subsequent acting means for adjusting the carrier to insure the alinement of the pencils with said operative means.

7. In a machine of the character described, a carrier, means on the carrier for supporting and rigidly clamping pencils in spaced relation thereon with their ends projecting beyond said supporting means, means for intermittently moving said carrier to successive stations, means disposed in alinement with one station and operable in timed relation to the operation of the carrier for securing a ferrule over the projecting end of a pencil, signal control means disposed opposite a point in the path of movement of the pencils on the carrier subsequent to the application of the ferrules thereto and movable each time a pencil reaches said point in its path of movement to engage the ferrule or in the event no ferrule has been applied, to cause a signal to be operated, and means independent of the ferrule securing means for actuating said control means to cause a signal to be operated when no ferrule has been applied to a pencil.

8. In a machine of the character described, a carrier, means on the carrier for supporting and rigidly clamping pencils in spaced relation thereon with their ends projecting beyond said supporting means, means for intermittently moving said carrier to successive stations, means disposed in alinement with one station and operable in timed relation to the operation of the carrier for securing a ferrule over the projecting end of a pencil, signal control means disposed opposite a point in the path of movement of the pencils on the carrier subsequent to the application of the ferrules thereto and movable each time a pencil reaches said point in its path of movement to engage the ferrule or in the event no ferrule has been applied, to cause a signal to be operated, and reciprocating means independent of the ferrule securing means for actuating said control means to cause a signal to be operated when no ferrule has been applied to a pencil.

9. In a machine of the character described, a carrier, means on the carrier for supporting and rigidly clamping pencils in spaced relation thereon with their ends projecting beyond said supporting means, means for intermittently moving said carrier to successive stations, means disposed in alinement with one station and operable in timed relation to the operation of the carrier for securing a ferrule over the projecting end of a pencil, means disposed in alinement with another station in advance of said first station in the direction of movement of the carrier, movable toward the carrier and operable in timed relation with respect to the operation thereof for inserting a plug in said ferrule, signal control means disposed opposite a point in the path of movement of the pencil on the carrier and subsequent to the insertion of the plugs in the ferrules and movable each time a pencil reaches said point in its path of movement to engage the ferrule or in the event no ferrule has been applied, to cause a signal to be operated, and means independent of the ferrule securing and of the plug inserting means for actuating said control means to cause a signal to be operated when no plug has been inserted in a pencil ferrule.

10. In a machine of the character described, means for supporting and holding, in a predetermined position, a pencil with a ferrule secured thereon and projecting therefrom, and means disposed opposite said predetermined position for inserting a plug in said ferrule, and stop mechanism automatically operatable by the pencil to stop the machine in the event that more than one plug is fed by the plug inserting means to said pencil ferrule.

11. In a machine of the character described, means for supporting and holding, in a predetermined position, a pencil with a ferrule secured thereon and projecting therefrom, and means disposed opposite said predetermined position for inserting a plug in said ferrule, and stop mechanism disposed at the opposite side of the carrier from that on which the plug inserting means is located and automatically operatable by the pencil to stop the machine in the event that more than one plug is fed by the plug inserting means to said pencil ferrule.

12. In a machine of the character described, a carrier, means for intermittently operating the carrier to successive stations, means on the carrier for clamping pencils thereon in spaced relation to each other and with their ends projecting beyond one side of the carrier, means disposed at said side of the carrier, operable in timed relation to the operation of the carrier and movable toward the carrier for securing ferrules on said projecting ends, and means engageable with the pencils on the carrier for longitudinally adjusting the pencils when they extend too far beyond one side of the carrier.

13. In a machine of the character described, a carrier, means for intermittently operating the carrier to successive stations, means on the carrier for clamping pencils thereon in spaced relation to each other and with their ends projecting beyond one side of the carrier, means disposed at said side of the carrier, operable in timed relation to the operation of the carrier and movable toward the carrier for securing ferrules on said projecting ends, and means engageable with the pencils on the carrier, during the movement of the carrier, for longitudinally adjusting the pencils when they extend too far beyond one side of the carrier.

CHARLES R. NICHOLS, Jr.